US012766810B2

(12) United States Patent
Otake et al.

(10) Patent No.: US 12,766,810 B2
(45) Date of Patent: Oct. 20, 2026

(54) ORGANIC CORE MATERIAL, PRODUCTION METHOD FOR SAME, LAMINATE INCLUDING ORGANIC CORE MATERIAL, AND CIRCUIT BOARD

(71) Applicant: Resonac Corporation, Tokyo (JP)

(72) Inventors: Shunsuke Otake, Tokyo (JP); Kazuyuki Mitsukura, Tokyo (JP); Takashi Masuko, Tokyo (JP); Kazuhiko Kurafuchi, Tokyo (JP); Shinji Shimaoka, Tokyo (JP); Hiroaki Fujita, Tokyo (JP)

( * ) Notice: Subject to any disclaimer, the term of this patent is extended or adjusted under 35 U.S.C. 154(b) by 666 days.

(21) Appl. No.: 18/245,348

(22) PCT Filed: Sep. 15, 2021

(86) PCT No.: PCT/JP2021/033953
§ 371 (c)(1),
(2) Date: Mar. 15, 2023

(87) PCT Pub. No.: WO2022/059711
PCT Pub. Date: Mar. 24, 2022

(65) Prior Publication Data
US 2023/0356498 A1 Nov. 9, 2023

(30) Foreign Application Priority Data
Sep. 18, 2020 (WO) .................. PCT/JP2020/035461

(51) Int. Cl.
*B32B 5/26* (2006.01)
*B32B 33/00* (2006.01)

(52) U.S. Cl.
CPC .............. *B32B 5/263* (2021.05); *B32B 33/00* (2013.01); *B32B 2260/023* (2013.01); *B32B 2260/046* (2013.01); *B32B 2457/00* (2013.01)

(58) Field of Classification Search
CPC ... B32B 5/263; B32B 33/00; B32B 2260/023; B29C 70/34
See application file for complete search history.

(56) References Cited

FOREIGN PATENT DOCUMENTS

CN 105027689 11/2015
JP H2-155726 6/1990
JP H02155726 A * 6/1990
(Continued)

OTHER PUBLICATIONS

Ip.com translation of JP-H02155726-A (Year: 2025).*
(Continued)

*Primary Examiner* — Daniel Mcnally
(74) *Attorney, Agent, or Firm* — SHIPWAY IP

(57) ABSTRACT

An organic core material including a first layer having a first fiber cloth and a first resin layer formed from a first resin component and having the first fiber cloth embedded therein, and a second layer having a second fiber cloth and a second resin layer formed from a second resin component and having the second fiber cloth embedded therein. The organic core material has a laminated structure including the second layer, a plurality of the first layers, and the second layer in order, and a content percentage of the second resin component based on a mass of the second resin layer is higher than a content percentage of the first resin component based on a mass of the first resin layer.

12 Claims, 7 Drawing Sheets

(56) References Cited

FOREIGN PATENT DOCUMENTS

| | | | | |
|---|---|---|---|---|
| JP | H5-261861 | | | 10/1993 |
| JP | H05261861 | A | * | 10/1993 |
| JP | H6-097670 | | | 4/1994 |
| JP | H0697670 | A | * | 4/1994 |
| JP | H7-232403 | | | 9/1995 |
| JP | 2007-110044 | | | 4/2007 |
| JP | 2014-167053 | | | 9/2014 |
| JP | 2015-191968 | | | 11/2015 |
| JP | 2016-056371 | | | 4/2016 |
| JP | 2018-165340 | | | 10/2018 |
| KR | 20140023980 | | | 2/2014 |
| KR | 20140136955 | | | 12/2014 |
| WO | 2012/099133 | | | 7/2012 |

OTHER PUBLICATIONS

International Preliminary Report on Patentability with Written Opinion dated Mar. 30, 2023 for PCT/JP2021/033953.
International Preliminary Report on Patentability with Written Opinion dated Mar. 30, 2023 for PCT/JP2020/035461.
International Search Report dated Dec. 22, 2020 for PCT/JP2020/035461.
International Search Report dated Dec. 7, 2021 for PCT/JP2021/033953.

* cited by examiner (a)

(b)

(c)

ORGANIC CORE MATERIAL, PRODUCTION METHOD FOR SAME, LAMINATE INCLUDING ORGANIC CORE MATERIAL, AND CIRCUIT BOARD

CROSS-REFERENCE TO RELATED APPLICATIONS

This application is a 35 U.S.C. § 371 national phase application of PCT/JP2021/033953, filed on Sep. 15, 2021, which claims priority to international application PCT/JP2020/035461, filed on Sep. 18, 2020.

TECHNICAL FIELD

The present disclosure relates to an organic core material, a method for producing the same, a laminated body including an organic core material, and a wiring board.

BACKGROUND ART

In recent years, electronic devices are becoming more and more compact, lightweight, and multifunctional. Along with this, semiconductor packages in which printed wiring boards and LSI (Large Scale Integration) are mounted are required to have higher density and higher reliability. Patent Literature 1 discloses a wiring board intended for realizing density increase in wiring layers. Patent Literature 2 discloses a printed wiring board and a semiconductor device intended for realizing excellent connection reliability.

CITATION LIST

Patent Literature

Patent Literature 1: Japanese Unexamined Patent Publication No. 2015-191968

Patent Literature 2: Japanese Unexamined Patent Publication No. 2016-056371

SUMMARY OF INVENTION

Technical Problem

In order to realize high density and high reliability of semiconductor packages to a greater extent, the requirements for the thickness accuracy of organic core materials are becoming stricter. Prepregs that are used for the manufacture of organic core materials include fiber cloth such as glass cloth as a reinforcing material. In paragraph 0057 of Patent Literature 2, it is described that an organic core material is manufactured through a step of interposing a plurality of sheets of prepregs between metal foils and press molding the resultant. According to the investigation of the inventors of the present invention, undulations occur on the surface of the organic core material obtained by press molding, due to the fiber cloth present inside the prepreg. This surface undulations may cause a decrease in yield in the manufacture of semiconductor packages.

For example, when a semiconductor chip having fine solder bumps is mounted on a wiring layer formed on an organic core material, the connection yield between the wiring and the solder bumps tends to be reduced under the effect of the surface undulations of the organic core material. Furthermore, when a wiring having a ratio of wiring width/space width=2/2 μm or less is formed on an insulating layer formed on an organic core material by using a Semi- Additive Process (SAP), the formation yield of a photoresist pattern tends to decrease and the wiring yield tends to decrease, under the effect of surface undulations. Even in the case of forming a wiring having a width wider than the ratio wiring width/space width=2/2 μm, the wiring width tends to vary due to the variations in the width of the photoresist pattern, and transmission loss occurring when a signal is transmitted to the wiring tends to increase.

The present disclosure provides an organic core material that is useful for realizing high density and high reliability of semiconductor packages to a greater extent, a method for producing the organic core material, a laminated body including an organic core material, and a wiring board.

Solution to Problem

In the method for producing an organic core material according to the present disclosure, at least two kinds of prepregs (first and second prepregs) are used. The first prepreg has a first fiber cloth and a first resin layer that is formed from a first resin component and has the first fiber cloth embedded therein. The second prepreg has a second fiber cloth and a second resin layer that is formed from a second resin component and has the second fiber cloth embedded therein. The second prepreg is richer in the resin component than the first prepreg. That is, the content percentage of the second resin component based on the mass of the second prepreg is higher than the content percentage of the first resin component based on the mass of the first prepreg. The content percentage of the second resin component based on the mass of the second prepreg is, for example, 60% by mass or more.

A first aspect of the method for producing an organic core material according to the present disclosure includes steps of: preparing a plurality of first prepregs; preparing at least two sheets of second prepregs; and heating a laminated body including a second prepreg, a plurality of first prepregs, and a second prepreg in order while applying a pressing force in a thickness direction of the laminated body (hereinafter, in some cases, referred to as "hot pressing step"). By carrying out the hot pressing step in a state in which a plurality of the first prepregs is sandwiched between the second prepregs rich in the resin component, an organic core material in which surface undulations caused by fiber cloth have been sufficiently reduced can be produced.

A second aspect of the method for producing an organic core material according to the present disclosure includes subjecting a laminated body of a plurality of first prepregs to the hot pressing step and then carrying out the hot pressing step again in a state in which second prepregs are disposed on both surfaces of this laminated body. That is, this production method includes steps of: preparing a plurality of first prepregs; preparing at least two sheets of second prepregs; heating a first laminated body of a plurality of first prepregs while applying a pressing force in a thickness direction of the first laminated body; and heating a second laminated body including a second prepreg, the first laminated body, and a second prepreg in order while applying a pressing force in the thickness direction of the second laminated body.

By carrying out the hot pressing step in a state in which the first laminated body is sandwiched between the second prepregs rich in the resin component, an organic core material in which surface undulations caused by fiber cloth have been sufficiently reduced can be produced.

According to these production methods, an organic core material having sufficiently flat surface can be produced.

Fine wiring can be formed with high precision by using such an organic core. The fact that the surface of an organic core is sufficiently flat can be shown by measuring the thickness of the organic core at multiple points and showing that the standard deviation of measured values is sufficiently small. In the organic core material according to the present disclosure, the standard deviation of the thicknesses at four points corresponding to the vertices of a square that measures 50 mm on each side as viewed in a plan view is, for example, 3.5 μm or less.

A first aspect of the organic core material according to the present disclosure has a laminated structure including a first layer and a second layer. The first layer is composed of a first fiber cloth and a first resin layer that is formed from a first resin component and has the first fiber cloth embedded therein. The second layer has a second fiber cloth and a second resin layer that is formed from a second resin component and has the second fiber cloth embedded therein. The second layer is richer in the resin component than the first layer. The organic core material according to the first embodiment has a laminated structure including a second layer, a plurality of the first layers, and a second layer in order, and the content percentage of the second resin component based on the mass of the second layer is higher than the content percentage of the first resin component based on the mass of the first layer.

Since the resin component-rich second layer is disposed in the vicinity of the surfaces of the organic core material, the organic core material has sufficiently flat surfaces. Such an organic core is useful for realizing high density and high reliability of a semiconductor package to a greater extent.

A second aspect of the organic core material according to the present disclosure has fiber cloths and resin layers alternately disposed in a longitudinal cross-section, and the standard deviation of the thicknesses at four points corresponding to the vertices of a square that measures 50 mm on each side as viewed in a plan view is 3.5 μm or less. In a longitudinal cross-section of this organic core material, for example, a fiber cloth thinner than the fiber cloth disposed at the central part of the organic core material is disposed in the vicinity of the surfaces of the organic core material (see (c) in FIG. 2). As a thin fiber cloth is disposed in the vicinity of the surfaces of the organic core material, surface undulations attributable to the fiber cloth can be suppressed. An organic core having flat surfaces is useful for realizing high density and high reliability of a semiconductor package to a greater extent.

The laminated body according to the present disclosure includes the above-described organic core material and an insulating layer provided on the surface of the organic core material. Since the organic core material has excellent thickness accuracy, the laminated body also has excellent thickness accuracy. Specifically, this laminated body is such that the standard deviation of the thicknesses at four points corresponding to the vertices of a square that measures 50 mm on each side as viewed in a plan view is 4.0 μm or less. The wiring board according to the present disclosure includes the above-described organic core material. By using an organic core material having excellent thickness accuracy, fine wiring having a width of 0.5 to 10 μm can be stably formed.

Advantageous Effects of Invention

According to the present disclosure, there are provided an organic core material that is useful for realizing high density and high reliability of semiconductor packages to a greater extent, a method for producing the organic core material, a laminated body including an organic core material, and a wiring board.

Figure 2:
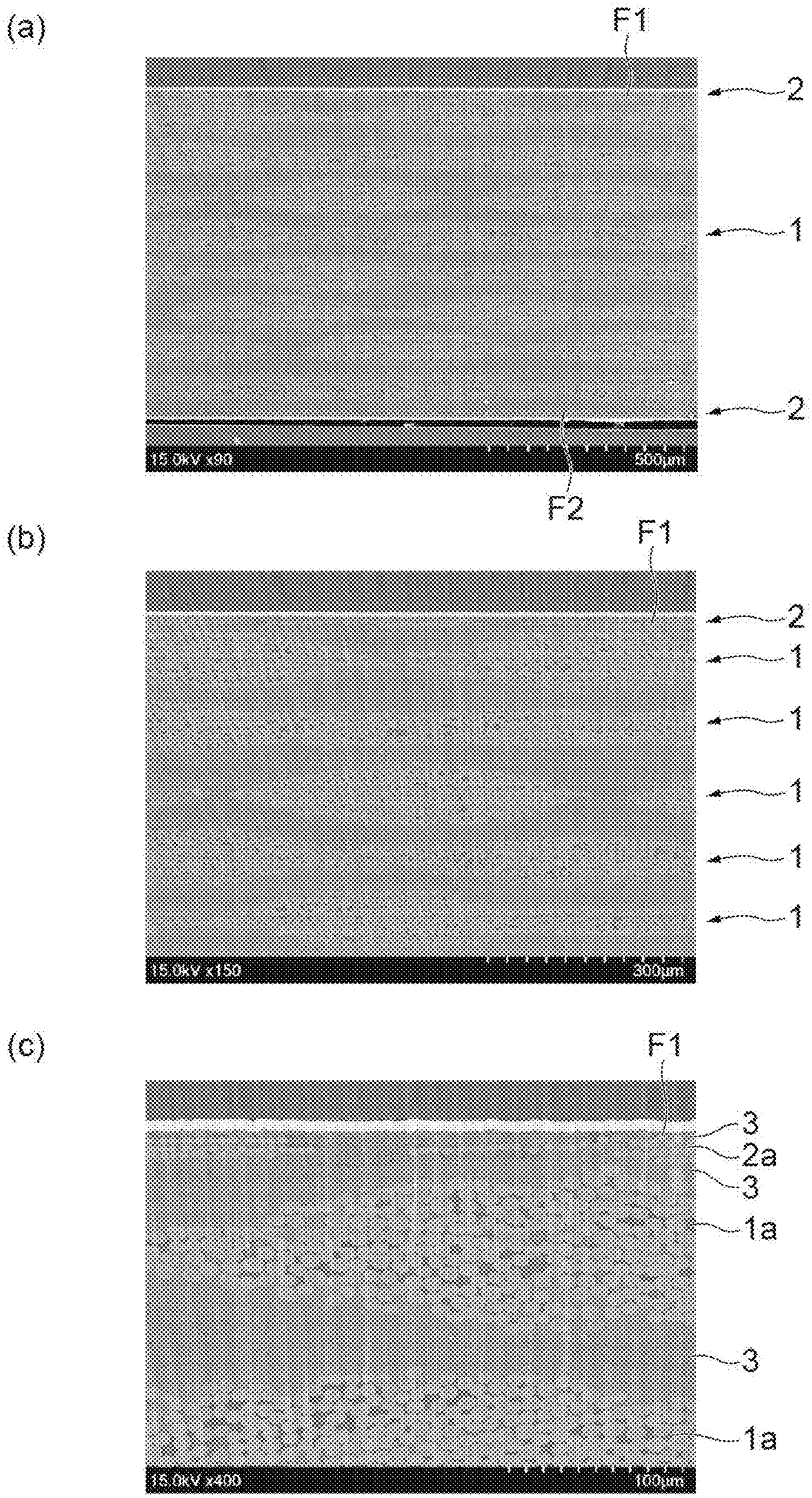

(a) to (c) in FIG. 2 are SEM photographs showing enlarged views of a cross-section of an organic core material according to an embodiment of the present disclosure.

Figure 3:
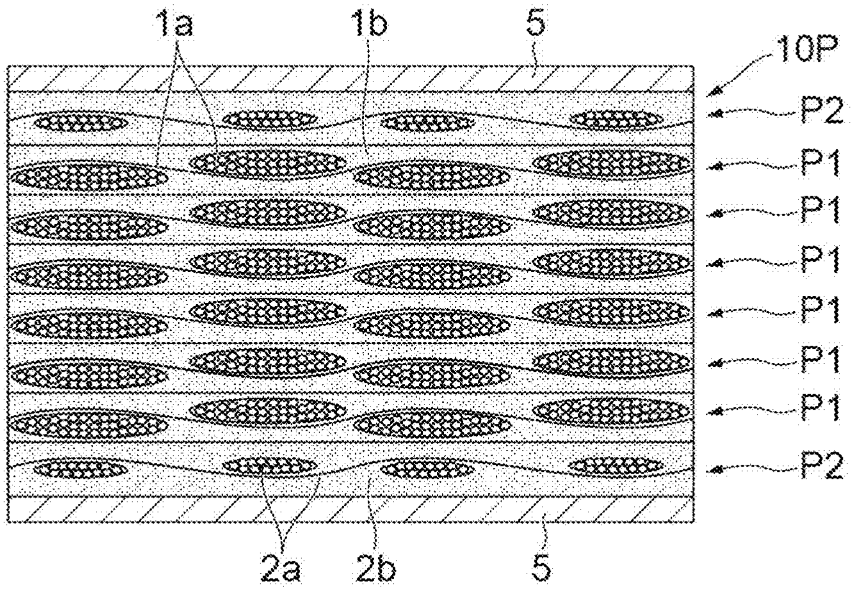

FIG. 3 is a cross-sectional view schematically illustrating a state in which a metal foil is disposed on the surface of a laminated body including first and second prepregs.

Figure 1:
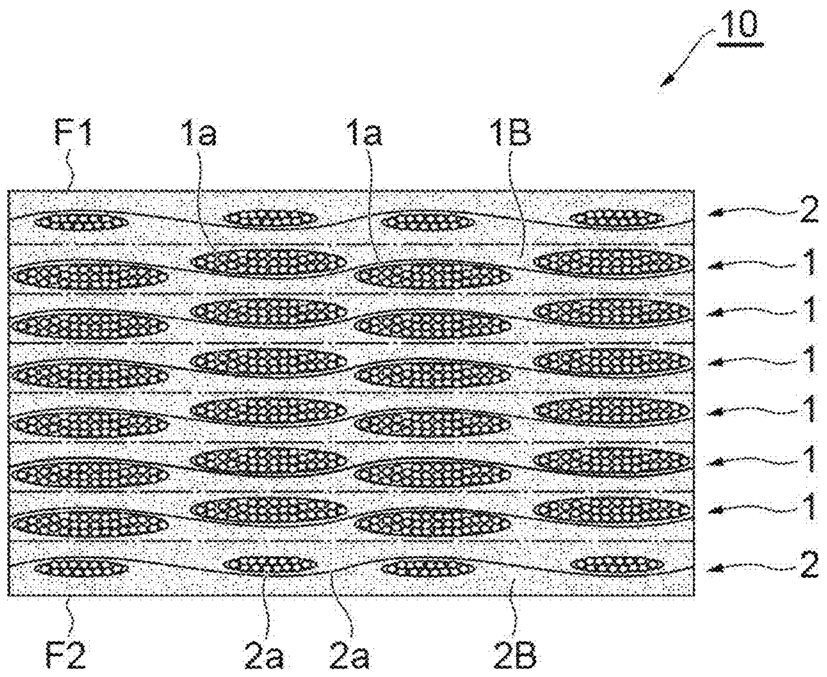
FIG. 1 is a cross-sectional view schematically illustrating an embodiment of an organic core material according to the present disclosure.
Figure 4:
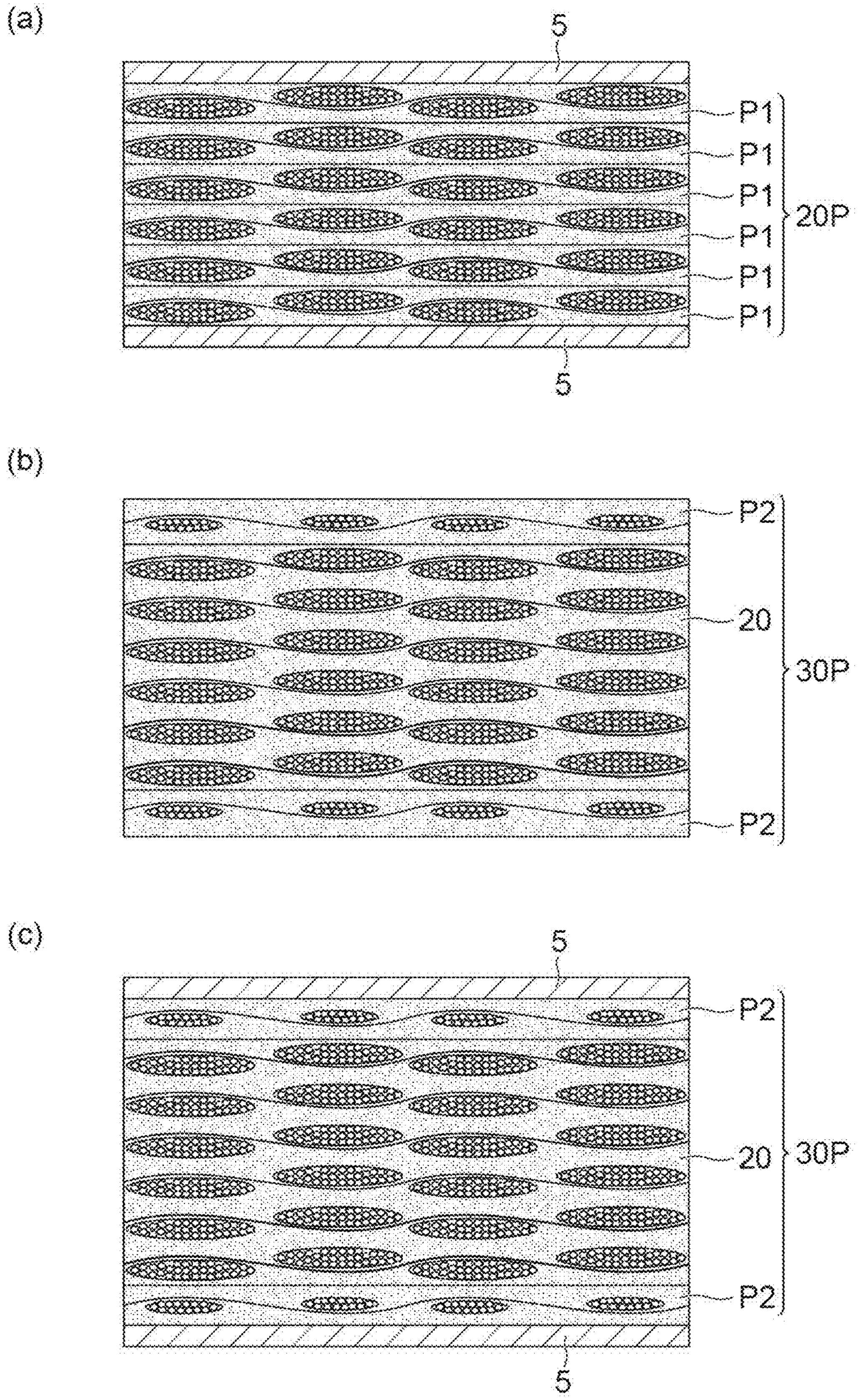

(a) to (c) in FIG. 4 are cross-sectional views schematically illustrating a production process for the organic core material shown in FIG. 1.

Figure 5:
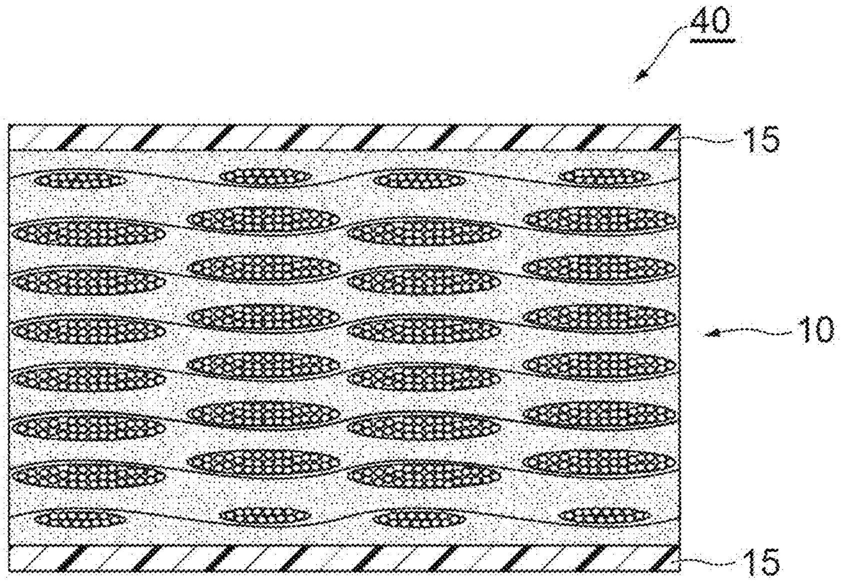
Figure 5:
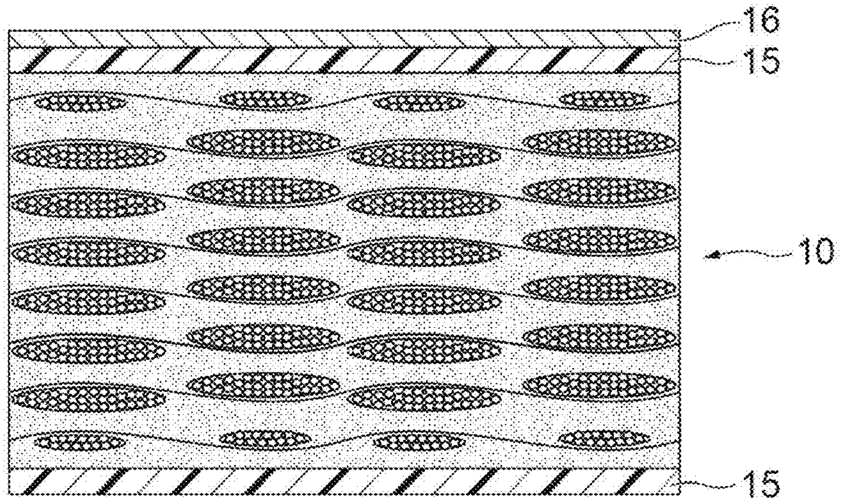
Figure 5:
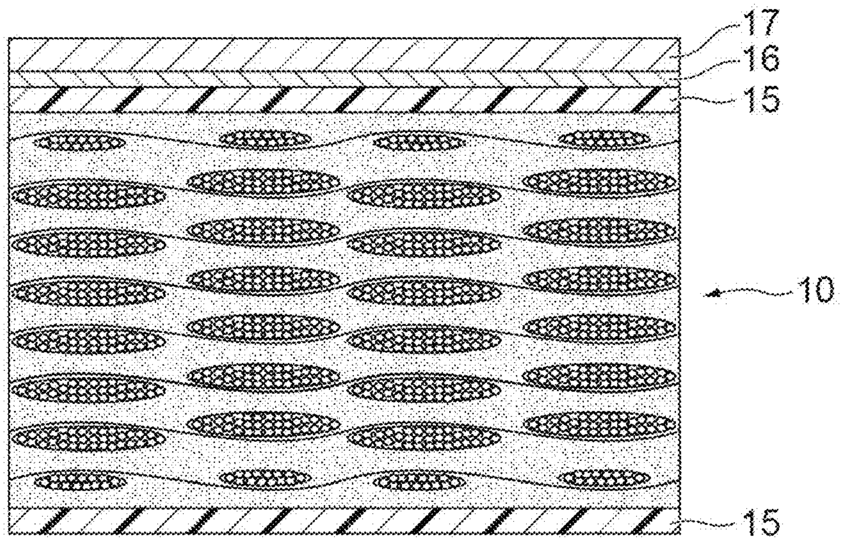

(a) to (c) in FIG. 5 are cross-sectional views schematically illustrating a step of producing a fine wiring board using the organic core material according to the present disclosure.

Figure 6:
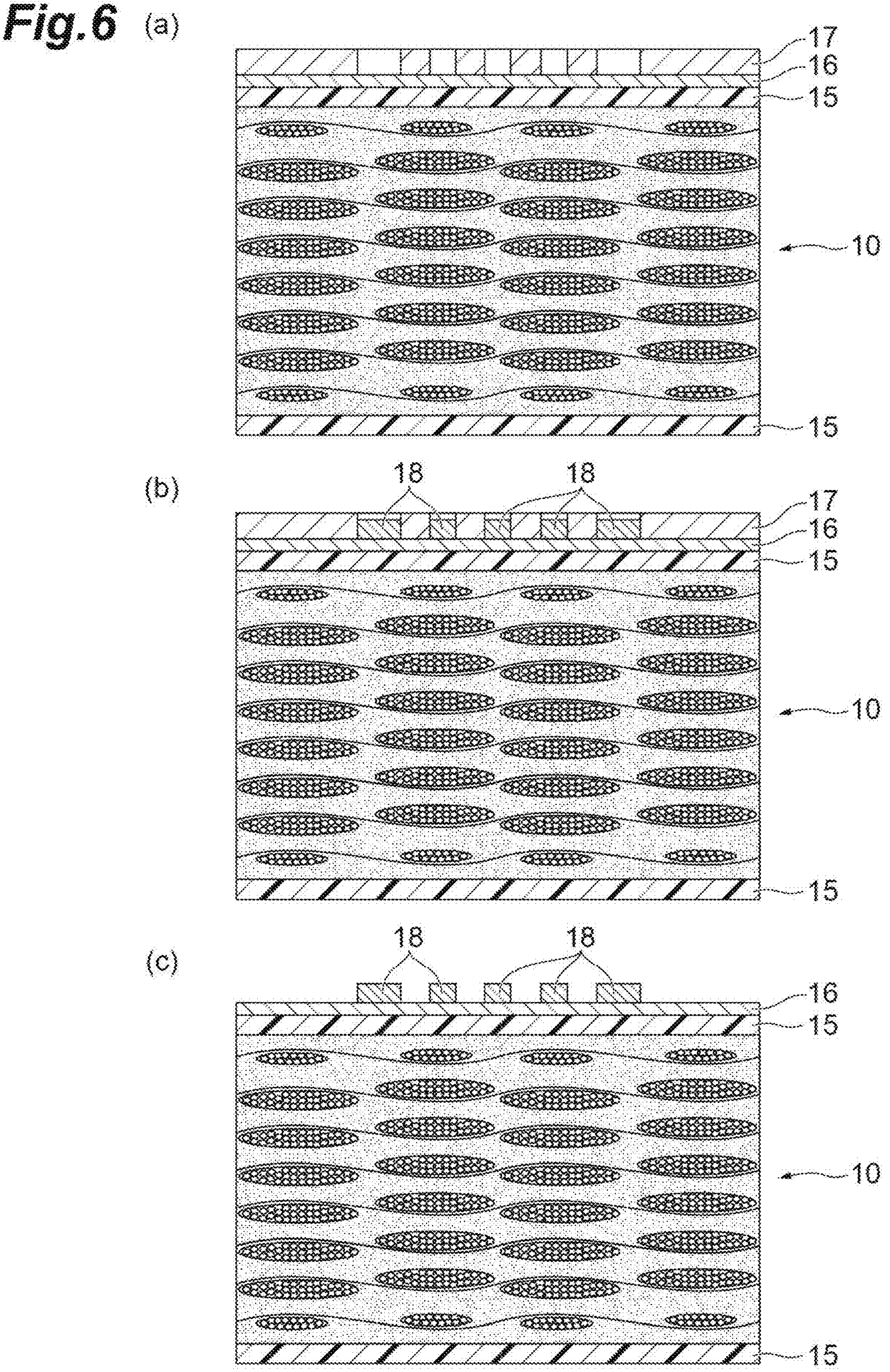

(a) to (c) in FIG. 6 are cross-sectional views schematically illustrating a step of producing a fine wiring board using the organic core material according to the present disclosure.

Figure 7:
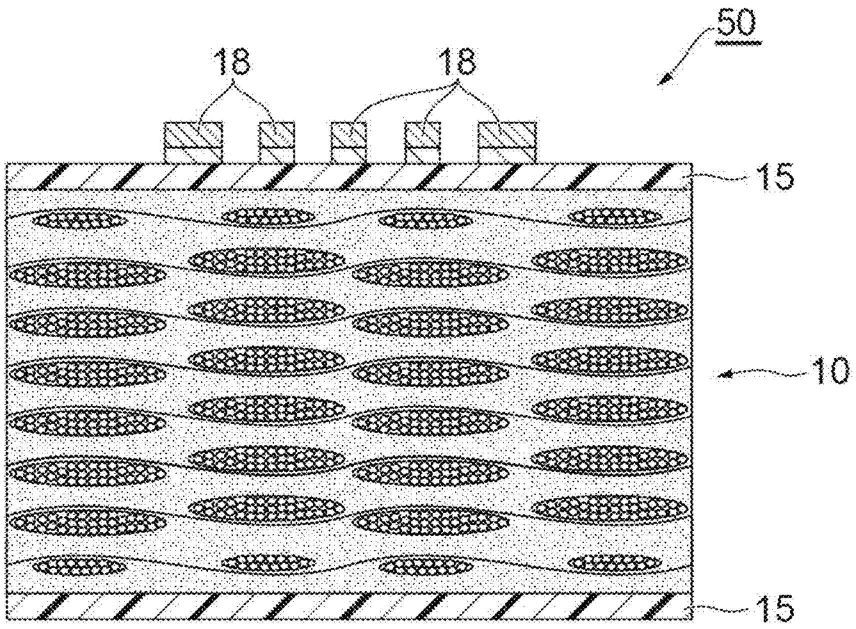

FIG. 7 is a cross-sectional view schematically illustrating a fine wiring board produced using the organic core material according to the present disclosure.

DESCRIPTION OF EMBODIMENTS

Several embodiments of the present disclosure will be described in detail below. However, the present invention is not intended to be limited to the following embodiments.

<Organic Core Material>

FIG. 1 is a cross-sectional view schematically illustrating an organic core material according to the present embodiment. The organic core material 10 shown in FIG. 1 has a laminated structure including first layers 1 and second layers 2. That is, the organic core material 10 has a laminated structure a second layer 2, a plurality of first layers 1, and a second layer 2 in order. Incidentally, FIG. 1 depicts an embodiment in which there are six layers of the first layer 1; however, the number of layers of the first layer 1 is not limited to six layers. Furthermore, each of the second layers 2 constituting the surfaces F1 and F2 of the organic core material 10 does not have to be a single layer, and each may be a plurality of layers.

The thickness of the organic core material 10 is, for example, 500 to 1600 μm and may be 600 to 1400 μm. When the thickness is 500 μm or more, warpage of the organic core material 10 tends to be suppressed, and satisfactory handleability tends to be obtained. On the other hand, when the thickness is 1600 μm or less, there is a tendency that deterioration of handleability due to weight can be suppressed. The thickness of the organic core material 10 can be adjusted by, for example, the number of layers of the first layer 1 and may also be adjusted by the number of layers of the second layer 2. The width of the organic core material 10 is, for example, 200 to 1300 mm from the viewpoint of productivity.

The first layer 1 has a first fiber cloth 1*a* and a first resin layer 1B that is formed from a first resin component and has the first fiber cloth 1*a* embedded therein. The second layer 2 has a second fiber cloth 2*a* and a second resin layer 2B that is formed from a second resin component and has the second fiber cloth 2*a* embedded therein. Incidentally, the fiber cloths 1*a* and 2*a* are composed of wefts (wavy lines in FIG. 1) and warps (ellipses in FIG. 1). The second layer 2 is richer in the resin component than the first layer 1. That is, the content percentage of the second resin component based on the mass of the second layer is higher than the content percentage of the first resin component based on the mass of the first layer.

The first layer 1 is a cured product of prepreg P1, and the second layer 2 is a cured product of prepreg P2 (see FIG. 3). In order to bring the second layer 2 into a state of being richer in the resin component than the first layer 1, a prepreg richer in the resin component than the prepreg P1 may be used as the prepreg P2. In order to make the second layer 2 rich in the resin component as compared with the first layer 1, for example, a prepreg P2 having a relatively thick second resin layer 2*b* may be used, or a prepreg P2 having a relatively thin second fiber cloth 2*a* may be used. A one-dot-dashed line in FIG. 1 represents a layer boundary.

(a) to (c) in FIG. 2 are SEM photographs showing enlarged view of a cross-section of the organic core material according to the present embodiment. (a) in FIG. 2 is a SEM photograph showing the overall configuration of the organic core material in the thickness direction extending from surface F1 to surface F2. (b) in FIG. 2 is a SEM photograph showing the surface F1 side enlarged from (a) in FIG. 2, and (c) in FIG. 2 is a SEM photograph showing the surface F1 side enlarged from (b) in FIG. 2. Each of the second layers 2 (cured products of the second prepreg) is disposed in the vicinity of the surfaces F1 and F2, and eight layers of the first layer 1 (cured product of the first prepreg) are disposed between these second layers 2. Incidentally, the resin components of adjacent prepregs are often integrated after curing, and there are occasions in which the boundary between the two prepregs may not be identified even when observed from a SEM photograph.

On the other hand, it could be confirmed by observation of a longitudinal cross-section by SEM that a resin layer 3 and fiber cloths (fiber cloths 1*a* and 2*a*) are alternately disposed. The SEM photographs shown in (a) to (c) in FIG. 2 show an example in which the fiber cloth 2*a* that is thinner than the fiber cloth 1*a* disposed in the central part of the organic core material, is disposed in the vicinity of the surfaces of the organic core material. As a cured product of a prepreg including a thin fiber cloth is disposed in the vicinity of the surfaces of the organic core material, surface undulations attributable to the fiber cloth can be suppressed.

The fiber cloths 1*a* and 2*a* are, for example, woven fabrics or nonwoven fabrics, both of which include an inorganic fiber. Examples of the fiber that constitutes the fiber cloth include natural fibers such as paper and cotton linter; inorganic fibers such as glass fibers and asbestos; organic fibers such as aramid, polyimide, polyvinyl alcohol, polyester, tetrafluoroethylene, and acrylic; and mixtures of these. Among these, glass fibers are preferred from the viewpoint of flame retardancy. Examples of the glass fibers include woven fabrics that use E glass, C glass, D glass, S glass, and the like, or glass woven fabrics in which short fibers are adhered with an organic binder; and mixtures of glass fibers and cellulose fibers. More preferred is a glass woven fabric that uses E glass. Glass fibers, carbon fibers, or a combination of these may also be used.

At least one of the fiber cloth 1*a* and the fiber cloth 2*a* may be a woven fabric, or both may be woven fabrics. A prepreg including a woven fabric has the following advantages as compared with a prepreg including a nonwoven fabric.

(1) It is easy to produce an organic core material having a small variation in thickness.

Since a woven fabric has a small variation in thickness, a prepreg obtained by impregnating a woven fabric with a resin component also has a small variation in thickness. Therefore, it is easy to produce an organic core material having a small variation in thickness by using a prepreg including a woven fabric. Incidentally, in a nonwoven fabric, since fibers are randomly present, the density of the fibers may differ depending on places, and therefore, there is a risk that a prepreg obtained by impregnating a nonwoven fabric with a resin component may have a large variation in thickness.

(2) It is easy to produce an organic core material having small warpage.

When a laminated body is produced by forming a resin layer (for example, a buildup layer) as a surface layer of the organic core material, internal stress may occur due to the difference between the coefficients of thermal expansion of the resin layer and the organic core material, and the laminated body may be warped. A woven fabric has a large elastic modulus and is more rigid than a nonwoven fabric, it is believed that the occurrence of warpage can be suppressed.

Furthermore, since a woven fabric has a stronger binding force in the planar direction of the organic core material than a nonwoven fabric, it is considered that the thermal expansion itself in the planar direction in the organic core material alone is also small.

(3) It is easy to produce an organic core material having excellent durability.

Since a woven fabric is woven with fibers, it is considered that a woven fabric itself is sturdy (having high toughness) as compared with a nonwoven fabric. For this reason, an organic core material including a woven fabric is considered to have excellent durability as compared with an organic core material including a nonwoven fabric.

(4) It is easy to produce an organic core material efficiently.

Since a woven fabric is less likely to be stretched by tension as compared with a nonwoven fabric, for example, it is possible to efficiently produce a prepreg having excellent dimensional stability and an organic core material including this prepreg by a roll-to-roll process. Furthermore, since a woven fabric itself has rigidity, after the woven fabric is impregnated with a resin component, the shape is easily maintained, and therefore, the organic core material is easily conveyed in this state.

The fiber cloth has a shape such as, for example, a woven fabric, a nonwoven fabric, a roving, a chopped strand mat, or a surfacing mat. Incidentally, the material and shape are selected according to the use application or performance of an intended molded product, and one kind thereof may be used alone, or if necessary, two or more kinds of materials and shapes may be combined.

The thickness of the fiber cloths 1*a* and 2*a* is, for example, 0.01 to 0.5 mm, and from the viewpoint of making it possible to obtain moldability and high-density wiring, the thickness may be 0.015 to 0.2 mm or 0.02 to 0.15 mm. From the viewpoints of heat resistance, moisture resistance, processability, and the like, the fiber cloth is preferably a cloth that has been surface-treated with a silane coupling agent or the like, a cloth that has been subjected to a mechanical fiber-opening treatment, or the like.

The first and second resin layers 1B and 2B (resin layer 3) are formed from a cured product of a thermosetting resin composition. These layers include an organic component as a resin component and optionally an inorganic component (for example, an inorganic filler). For the layers 1 and 2, components excluding an inorganic fiber component (fiber cloth) can be regarded as the resin component.

The content percentage of the resin component in the first layer 1 may be 20% to 90% by mass with respect to the mass of the first layer 1, may be 20% to 80% by mass from the viewpoint of lowering the coefficient of linear expansion, may be 30% to 90% by mass from the viewpoint of reducing voids after lamination, or may be 40% to 90% by mass from the viewpoint of even further improving the flatness of the substrate material. On the other hand, as described above, the second layer 2 is richer in the resin component than the first layer 1. That is, the content percentage of the resin component in the second layer 2 may be 60% to 95% by mass with respect to the mass of the second layer 2, may be 60% to 80% by mass from the viewpoint of lowering the coefficient of linear expansion, may be 65% to 95% by mass from the viewpoint of reducing voids after lamination, or may be 70% to 95% by mass from the viewpoint of even further improving the flatness of the substrate material. The content percentage of the resin component in both the first layer 1 and the second layer 2 may be 85% by mass or less. When this content percentage is 85% by mass or less, there is a tendency that flow of the resin component can be suppressed at the time of producing the prepregs constituting the first layer 1 and the second layer 2 by coating, and as a result, the occurrence of unevenness in the thickness of the resin layer can be suppressed.

The content percentage of the organic component in the layers 1 and 2 can be calculated by methods such as ash content measurement. Ash content measurement is a method of calculating the proportion of organic components in a resin component by carbonizing the organic components at a high temperature. An example of the inorganic component is an inorganic filler. For the layers 1 and 2, components excluding the inorganic filler may be regarded as the resin component.

The mass proportion of the resin component included in the layers 1 and 2 can be calculated from a microscopic image of a cross-section of the organic core material 10. An image of a cross-section is binarized, and the area ratios of the fiber cloths 1*a* and 2*a* and the resin layers 1*b* and 2*b* are calculated. The area ratio is calculated as a volume ratio. The mass ratio can be calculated by multiplying the volume ratio of the fiber cloths 1*a* and 2*a* and the resin layers 1*b* and 2*b* by the respective specific gravities of the fiber cloths 1*a* and 2*a* and the resin layers 1*b* and 2*b*. The mass proportion of the resin component is calculated from the mass ratio.

For example, for a prepreg in which the fiber cloth is a glass cloth, and a resin component containing an epoxy resin and fused silica as main components is used for the resin layer, a method for calculating the mass proportion of the resin component will be described. The specific gravity of a glass cloth is about 2 to 3 g/$cm^3$, and the specific gravity of a resin containing an epoxy resin and fused silica as main components is about 0.8 to 2.5 g/$cm^3$. When the area ratio of the glass cloth and the resin component is 4:6, the mass ratio of the glass cloth and the resin component is between glass cloth: resin component=4×3:6×0.8=25:10 and glass cloth:resin content=4×2:6×2.5=5:10. When the mass proportion of the resin component is calculated from the mass ratio, the mass proportion is about 29% by mass to about 65% by mass.

For example, in a case where the mass proportion of the resin component is calculated for a prepreg that uses a glass cloth having a specific gravity of 2.6 g/$cm^3$ as the fiber cloth and a resin component containing an epoxy resin having a specific gravity of 1.8 g/$cm^3$ and fused silica as main components as the resin component, when the proportion of area occupied by the resin content in the entire cross-sectional area of the prepreg is 69% or more, the mass proportion of the resin component is 60% by mass or more.

As the second layer 2 that is rich in the resin component is disposed in the vicinity of the surfaces of the organic core material 10, the organic core material 10 has sufficiently flat surfaces F1 and F2. The organic core material 10 is useful for realizing high density and high reliability of semiconductor packages to a greater extent. The flatness of the surface of the organic core material can be evaluated by measuring the thickness of the organic core material 10 at a plurality of different positions and evaluating the standard deviation of the thicknesses. The standard deviation of the thickness of the organic core material 10 may be 4 μm or less, 3.5 μm or less, 3 μm or less, 2.5 μm or less, or 2 μm or less, and may be 0.1 μm or more. The standard deviation of the thickness of the organic core material 10 may be a value σ calculated by the following formula from thicknesses $T_1$, $T_2$, . . . , and $T_n$ of the organic core material 10 obtained at each of any n points of positions.

$$\sigma = \sqrt{\frac{1}{n}\sum_{i=1}^{n}(T_i - T)^2}$$ [Mathematical Formula 1]

Regarding the positions where the thickness of the organic core material 10 is measured, for example, the entire principal surface of the organic core material 10 can be divided into a plurality of regions each having an area of 2500 $mm^2$, and one or more positions can be selected from each of the regions. The entire principal surface of the organic core material 10 is divided such that the number of multiple regions each having an area of 2500 $mm^2$ is maximal. The thickness is measured by using, for example, a micrometer. For example, as viewed in a plan view of the organic core material 10, the standard deviation of thickness at four points corresponding to the vertices of a square that measures 50 mm on each side may be, for example, 3.5 μm or less, 3 μm or less, 2.5 μm or less, or 2 μm or less, and may be 0.1 μm or more. The standard deviation of thickness at four points corresponding to the vertices of a square that measures 70 mm on each side may be, for example, 5.0 μm or less, 4.5 μm or less, 4.0 μm or less, or 3.6 μm or less, and may be 0.1 μm or more.

(Prepreg)

A prepreg is produced by, for example, impregnating a fiber cloth with a thermosetting resin composition and then subjecting the resultant to a heating treatment. Alternatively, a prepreg may also be produced by preparing a film of a thermosetting resin composition in advance, sandwiching a fiber cloth with a pair of the films, and then subjecting the resultant to a heating treatment. As a result of the heating treatment, the thermosetting resin composition is converted to B-stage. From the viewpoints of handleability and tackiness, it is preferable that the prepreg is subjected to a cooling step of cooling this prepreg. Cooling of the prepreg may be carried out by natural cooling or may be carried out by using a cooling apparatus such as an air blowing apparatus or a cooling roll. The temperature of the prepreg after cooling is usually 5° C. to 80° C., preferably 8° C. to 50° C., more preferably 10° C. to 30° C., and even more preferably room temperature. The thickness of one sheet of prepreg is not particularly limited; however, for example, the thickness is preferably 20 to 150 μm, and more preferably 60 to 120 μm.

Examples of the thermosetting resin that is included in the thermosetting resin composition include an epoxy resin, a phenol resin, an unsaturated imide resin, a cyanate resin, an isocyanate resin, a benzoxazine resin, an oxetane resin, an unsaturated polyester resin, an allyl resin, a dicyclopentadiene resin, a silicone resin, a modified silicone resin, a triazine resin, a melamine resin, a urea resin, and a furan resin. Furthermore, the thermosetting resin is not particularly limited to these, and any known thermosetting resin can be used. These may be used singly, or two or more kinds thereof may be used in combination. Among these, an epoxy resin, an unsaturated imide resin, and a modified silicone resin are preferred.

Examples of the epoxy resin include, but are not particularly limited to, bisphenol type epoxy resins such as a bisphenol A type epoxy resin, a bisphenol F type epoxy resin, and a bisphenol S type epoxy resin; alicyclic epoxy resins, aliphatic chain-like epoxy resins; novolac type epoxy resins such as a phenol novolac type epoxy resin, a cresol novolac type epoxy resin, a bisphenol A novolac type epoxy resin, and a bisphenol F novolac type epoxy resin; phenol aralkyl type epoxy resins; stilbene type epoxy resins; dicyclopentadiene type epoxy resins, naphthol skeleton-containing type epoxy resins such as a naphthol novolac type epoxy resin and a naphthol aralkyl type epoxy resin; biphenyl type epoxy resins; biphenyl aralkyl type epoxy resins; xylylene type epoxy resins; and dihydroanthracene type epoxy resins. Among these, a naphthalene skeleton-containing type epoxy resin may be selected, or a naphthol aralkyl type epoxy resin may be selected.

Examples of the unsaturated imide resin include a maleimide resin, an addition reaction product of a maleimide resin and a monoamine compound, and a reaction product of a maleimide resin, a monoamine compound, and a diamine compound. Examples of the maleimide compound include, but are not particularly limited to, bis(4-maleimidophenyl) methane, polyphenylmethanemaleimide, bis(4-maleimidophenyl) ether, 3,3'-dimethyl-5,5'-diethyl-4,4'-diphenylmethane bismaleimide, 4-methyl-1,3-phenylene bismaleimide, m-phenylene bismaleimide, bis(4-maleimidophenyl) sulfone, bis(4-maleimidophenyl) sulfide, bis(4-maleimidophenyl) ketone, 2,2-bis(4-(4-maleimidophenoxy)phenyl) propane, bis(4-(4-maleimidophenoxy)phenyl) sulfone, 4,4'-bis(3-maleimidophenoxy) biphenyl, and 1,6-bismaleimido (2,2,4-trimethyl) hexane. Among these, bis(4-maleimidophenyl) methane may be selected.

The monoamine compound is preferably a monoamine compound having an acidic substituent (for example, a hydroxyl group or a carboxy group) is preferred, and specific examples include o-aminophenol, m-aminophenol, p-aminophenol, o-aminobenzoic acid, m-aminobenzoic acid, p-aminobenzoic acid, o-aminobenzenesulfonic acid, m-aminobenzenesulfonic acid, p-aminobenzenesulfonic acid, 3,5-dihydroxyaniline, and 3,5-dicarboxyaniline.

The diamine compound is preferably a diamine compound having at least two benzene rings, and more preferably a diamine compound having at least two benzene rings arranged between two amino groups in a straight-chain form, and examples thereof include 4,4'-diaminodiphenylmethane, 4,4'-diamino-3,3'-dimethyl-diphenylmethane, 4,4'-diamino-3,3'-diethyl-diphenylmethane, 4,4'-diaminodiphenyl ether, 4,4'-diaminodiphenylsulfone, 3,3'-diaminodiphenylsulfone, and 4,4'-diaminodiphenyl ketone.

As the unsaturated imide resin, for example, the maleimide compounds described in Japanese Unexamined Patent Publication No. 2018-165340 and the like may be used.

An embodiment in which the resin layers 1*b* and 2*b* contains, in addition to the above-described thermosetting resin, at least one selected from a curing agent, a curing accelerator, an inorganic filler material, an organic filler material, a coupling agent, a leveling agent, an oxidation inhibitor, a flame retardant, a flame retardant aid, a thixotropy-imparting agent, a thickener, a thixotropy-imparting agent, a flexible material, a surfactant, a photopolymerization initiator material, and the like as necessary, is preferred. Particularly, with regard to the inorganic filler material, in the present embodiment, since the thickness accuracy can be increased without highly filling this inorganic filler material, the content of the inorganic filler material can be set to, for example, 10% to 60% by volume, may be set to 20% to 60% by volume, or may be set to 30% to 60% by volume, and for these numerical value ranges, the upper limit value can be further set to 57% by volume or can be set to 55% by volume. However, when it is necessary to highly fill the inorganic filler material, in the present embodiment, it is not necessarily denied that the content of the inorganic filler material should exceed 60% by volume, and for example, the upper limit value of the numerical value range of the content may be set to 70% by volume or may be set to 80% by volume.

Furthermore, for example, a thermosetting resin composition containing the modified silicone compound (modified silicone resin) and optionally at least one selected from the group consisting of another thermosetting resin, a curing agent, a curing accelerator, an inorganic filler material, a thermoplastic resin, an elastomer, an organic filler material, a flame retardant, an ultraviolet absorber, an oxidation inhibitor, a photopolymerization initiator, a fluorescent brightening agent, an adhesiveness improving agent, and the like, as described in International Publication WO 2012/099133, and the like can also be used.

The modified silicone compound is preferably a both-terminal amino-modified silicone compound, and specifically, the modified silicone compound is a both-terminal amino-modified silicone compound obtained by reacting (A) a siloxane diamine represented by the following General Formula (1), (B) a maleimide compound having at least two N-substituted maleimide groups in the molecular structure, and (C) an amine compound having an acidic substituent represented by the following General Formula (2), while the details are as described in International Publication WO 2012/099133.

[Chemical Formula 1]

(1)

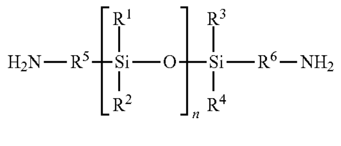

In Formula (1), a plurality of $R^1$'s each independently represent an alkyl group, a phenyl group, or a substituted phenyl group and may be identical with or different from each other; a plurality of $R^2$'s each independently represent an alkyl group, a phenyl group, or a substituted phenyl group and may be identical with or different from each other; $R^3$ and $R^4$ each independently represent an alkyl group, a phenyl group, or a substituted phenyl group; $R^5$ and $R^6$ each independently represent a divalent organic group; and n represents an integer from 2 to 50.

[Chemical Formula 2]

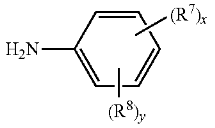

(2)

In Formula (2), when a number of $R^7$'s are present, $R^7$'s each independently represent a hydroxyl group, a carboxyl group, or a sulfonic acid group; when a number of $R^8$'s are present, $R^8$'s each independently represent a hydrogen atom, an aliphatic hydrocarbon group having 1 to 5 carbon atoms, or a halogen atom; x represents an integer from 1 to 5; y represents an integer from 0 to 4; and x+y=5.

<Method for Producing Organic Core Material>

Next, a method for producing an organic core material 10 will be described. The production method according to the present embodiment includes the following steps.

(A1) A step of preparing a plurality of first prepregs P1.

(B1) A step of preparing at least two sheets of second prepregs P2.

(C1) A step of heating a laminated body 10P including a second prepreg P2, a plurality of first prepregs P1, and a second prepreg P2 in order while applying a pressing force in the thickness direction of the laminated body 10P.

FIG. 3 is a cross-sectional view schematically illustrating a state in which a metal foil is disposed on the surface of a laminated body including prepregs P1 and P2. The first prepreg P1 has a first fiber cloth 1*a* and a first resin layer 1*b* that is formed from a first resin component and has the first fiber cloth 1*a* embedded therein. The second prepreg P2 has a second fiber cloth 2*a* and a second resin layer 2*b* that is formed from a second resin component and has the second fiber cloth 2*a* embedded therein. The second prepreg P2 is richer in the resin component than the first prepreg P1. The first prepreg P1 becomes a first layer 1 by being subjected to a curing treatment. The second prepreg P2 becomes a second layer 2 by being subjected to a curing treatment.

The hot pressing step of step (C1) is carried out by, for example, using multi-stage pressing, multi-stage vacuum pressing, continuous molding, or an autoclave molding machine. As shown FIG. 3, the hot pressing step may be carried out in a state in which a metal foil 5 is disposed on each of the surfaces of the laminated body 10P.

The hot pressing temperature is, for example, 100° C. to 250° C. The time for heating and pressurization after temperature increase is, for example, 0.1 to 5 hours. The organic core material after heating and pressurization may be further heated as necessary. During the period from the temperature increase to the heating and pressurization at the hot pressing temperature, the laminated body 10P is usually pressurized continuously. The pressure to be applied to the laminated body 10P during the period from the temperature increase to the heating and pressurization at the hot pressing temperature may be, for example, 0.2 to 10 MPa. After the hot pressing step, the organic core material 10 is obtained by etching the metal foil 5. The metal foil 5 can be removed by etching by, for example, using a ferric chloride liquid, ammonium persulfate, or the like.

In the above-described embodiment, a case of producing the organic core material 10 by carrying out the hot pressing step one time has been described; however, as will be described below, the organic core material 10 may also be produced through two times of the hot pressing step. That is, this production method includes the following steps.

(A2) A step of preparing a plurality of first prepregs P1.

(B2) A step of preparing at least two sheets of second prepregs P2.

(C2) A step of heating a laminated body 20P (first laminated body) composed of a plurality of first prepregs P1 while applying a pressing force in the thickness direction of the laminated body 20P.

(D2) A step of heating a laminated body 30P (second laminated body) including a second prepreg P2, a laminated body 20P, and a second prepreg P2 in order while applying a pressing force in the thickness direction of the laminated body 30P.

The hot pressing step of step (C2) may be carried out in a state in which a metal foil 5 is disposed on each of the two surfaces of the laminated body 20P, as shown in (a) FIG. 4. Thereafter, the metal foils 5 are etched, and then the second prepreg P2 is disposed on each of the surfaces of the laminated body 20 (cured product of the laminated body 20P) (see (b) in FIG. 4). Furthermore, a metal foil 5 is disposed on each of the surfaces of the second prepreg P2 (see (c) in FIG. 4). In step (D2), the laminated body P30 is subjected to a hot pressing step. Thereafter, the organic core material 10 is obtained by etching the metal foils 5.

By performing the curing treatment of the second prepreg P2 by a process different from the curing treatment of a plurality of the first prepregs P1, step (D2) can be carried out under conditions appropriate for the curing treatment of the second prepreg P2, and the surface undulations of the organic core material 10 can be further suppressed.

A printed wiring board may be produced by subjecting the metal foils 5 to circuit processing without etching the metal foils 5 on the surfaces of the organic core material 10. From the viewpoint of conductivity, the metal of the metal foil 5 is preferably copper, gold, silver, nickel, platinum, molybdenum, ruthenium, aluminum, tungsten, iron, titanium, chromium, or an alloy including at least one of these metal elements, more preferably copper or aluminum, and even more preferably copper, and circuit processing can be carried out by, for example, forming a resist pattern on the surface of a metal foil, subsequently removing the metal foil in unnecessary parts by etching, peeling off the resist pattern, subsequently forming necessary through-holes by drilling, forming a resist pattern again, subsequently performing plating for making the through-holes conductive, and finally peeling off the resist pattern.

A semiconductor package can be produced by mounting a semiconductor chip, a memory, and the like at predetermined positions of the printed wiring board. A semiconductor package that uses the organic core material of the present embodiment has a small variation in thickness, and therefore, the yield at the time of mounting a semiconductor chip tends to be improved.

<Method for Producing Wiring Board>

A wiring board can be produced by forming fine wiring on the surface of a laminated body including an organic core material. Examples of a method for forming fine wiring include a subtractive method, a full additive method, a semi-additive method (SAP: Semi Additive Process), and a modified semi-additive method (m-SAP: modified Semi Additive Process).

(a) to (c) in FIG. 5 and (a) to (c) in FIG. 6 are cross-sectional views schematically illustrating steps for producing a fine wiring board according to a semi-additive method using the organic core material 10. While referring to these diagrams, the method for producing a wiring board 50 shown in FIG. 7 will be described.

A wiring board 50 is produced by, for example, the following steps.

(A) A step of forming an insulating layer 15 on both surfaces of the organic core material 10 (see (a) in FIG. 5)

(B) A step of forming a seed layer 16 on the surface of one insulating layer 15 by, for example, sputtering or electroless plating (see (b) in FIG. 5)

(C) A step of forming a photosensitive resin layer 17 on the surface of the seed layer 16 (see (c) in FIG. 5)

(D) A step of forming a resist pattern by subjecting the photosensitive resin layer 17 to an exposure-developing treatment (see (a) in FIG. 6)

(E) A step of forming a wiring 18 by electrolytic plating in a region that is on the surface of the seed layer 16 and is exposed from the resist pattern (see (b) FIG. 6)

(F) A step of removing the resist pattern (see (c) FIG. 6)

(H) A step of removing the seed layer 16 exposed by removing the resist pattern The laminated body 40 shown in (a) in FIG. 5 includes the organic core material 10 and an insulating layer 15. The insulating layer 15 can be formed with a resin composition having insulating properties and may also be formed by means of a buildup film. The insulating layer 15 may be a single layer or a multilayer. The above-described resin composition may have thermosetting properties or may have photocuring properties. The thickness of the insulating layer 15 is, for example, 10 to 360 μm and may be 120 to 240 μm.

Since the thickness accuracy of the organic core material 10 is high, the laminated body 40 also has excellent thickness accuracy. The standard deviation of the thickness of the laminated body 40 at four points corresponding to the vertices of a square that measures 50 mm on each side as viewed in a plan view of the laminated body 40 is, for example, 4.0 μm or less or may be 3.8 μm or less, 3.4 μm or less, or 3.2 μm or less, and the standard deviation may be 0.1 μm or more. The standard deviation of the thickness at four points corresponding to the vertices of a square that measures 70 on each side is, for example, 4.4 μm or less or may be 4.1 μm or less, 3.8 μm or less, or 3.6 μm or less, and the standard deviation may be 0.1 μm or more.

A circuit pattern including the wiring 18 is formed on the surface of the insulating layer 15 through the above-described step (H) (see FIG. 7). The wiring 18 has a fine trench structure. The width of the wiring 18 is, for example, 0.5 to 10 μm or may be 0.5 to 5 μm. The distance between two adjacent wirings 18 (space width) is, for example, 0.5 to 10 μm or may be 0.5 to 5 μm.

EXAMPLES

Hereinafter, the present disclosure will be described more specifically by way of Examples. However, the present invention is not intended to be limited to the following Examples.

Examples 1 and 2

First, a prepreg was produced by the following procedure. Into a flask equipped with a stirrer, a thermometer, and a nitrogen purging apparatus, 24 g of silicone diamine (trade name "KF-8010", manufactured by Shin-Etsu Chemical Co., Ltd.), 240 g of bis(4-maleimidophenyl) methane, and 400 g of propylene glycol monomethyl ether were introduced and reacted for 4 hours at 115° C., subsequently the temperature was raised to 130° C., the reaction mixture was concentrated at normal temperature, and a solution having a resin content of 60% by mass was obtained. 40 g of a biphenylaralkyl type epoxy resin ("NC-3000-H", manufactured by Nippon Kagaku Co., Ltd.), 50 g of the above-described thermoplastic resin in terms of solid content, 0.5 g of a curing accelerator (trade name "2P4MHZ-PW", manufactured by SHIKOKU CHEMICALS CORPORATION), and 40 g of a silica slurry (trade name "SC2050-KNK", manufactured by Admatechs Company Limited) in terms of solid content were blended, a predetermined amount of N-methyl-2-pyrrolidone was blended therein, the mixture was stirred for 30 minutes so as to become uniform, and a resin varnish including resins and a silica slurry and having a solid content of 65% by mass was obtained.

A roll of a woven fabric of glass cloth (thickness: 0.1 mm, glass fiber: E glass) was prepared. While the woven fabric was pulled out from this roll, the woven fabric was impregnated and coated with the above-described varnish. The resultant was heated and dried for 10 minutes at 150° C. to produce a prepreg having a mass proportion of the resin content of 50% by mass. On the other hand, another roll of a woven fabric of glass cloth (thickness: 0.015 mm, glass fiber: E glass) was prepared. While the woven fabric was pulled out from this roll, the woven fabric was impregnated and coated with the above-described varnish. The resultant was heated and dried for 10 minutes at 150° C. to produce a prepreg having a mass proportion of the resin content of 70% by mass. The resin content of the prepreg was calculated by including all the components other than the glass cloth constituting the prepreg and also including the components of the silica slurry. Measurement of the mass proportion of the resin content was calculated by dividing the difference in mass between the prepreg and the glass cloth, by the mass of the prepreg. Regulation of the width of gaps during impregnation and coating was repeated until prepregs having a mass proportion of the resin content of 50% by mass and 70% by mass were obtained. Two kinds of prepregs having excellent dimensional stability could be obtained through these steps. In order to produce organic core materials, the two kinds of prepregs were cut into a predetermined size.

Six sheets of a prepreg of a 250-mm square size and having a mass proportion of the resin content of 50% by mass were superposed, a copper foil (thickness 5 μm, manufactured by MITSUI MINING & SMELTING CO., LTD.) of a 270-mm square size on the outer side of the prepreg, a stainless steel plate (thickness 1.8 mm) of a 260-mm square size on the further outer side thereof, a copper foil (thickness 5 μm, manufactured by MITSUI MINING & SMELTING CO., LTD.) of a 270-mm square size on the further outer side thereof, five sheets of a cushion material (thickness 0.2 mm, manufactured by Oji Paper Co., Ltd., KS190) of a 265-mm square size on the further outer side thereof, and a copper foil (thickness 12 μm, manufactured by MITSUI MINING & SMELTING CO., LTD.) of a 260-mm square size on the further outer side thereof were disposed on each of both surfaces of the prepregs, the resultant was heated and pressurized by using a pressing apparatus (manufactured by Meiki Co., Ltd., MHPC-VF-350-350-3-70) under the conditions of a pressure of 3 MPa, a degree of vacuum of 40 hPa, a temperature increase rate of 4° C./min, a temperature of 240° C. and a retention time of 85 minutes, and an organic core material was obtained (see (a) in FIG. 4).

The obtained organic core material was immersed in an aqueous solution of ammonium persulfate, and the copper foil was etched (see (b) in FIG. 4). One sheet of a prepreg of a 250-mm square size and having a mass proportion of the resin content of 70% by mass was disposed on each of the upper surface and the lower surface of the organic core material after etching. A copper foil (thickness 5 μm, manufactured by MITSUI MINING & SMELTING CO., LTD.) of a 270-mm square size was disposed on the outer side of the prepreg having a mass proportion of the resin component of 70% by mass (see (c) in FIG. 4). A stainless steel plate (thickness 1.8 mm) of a 260-mm square size on the further outer side of this copper foil, a copper foil (thickness 5 μm, manufactured by MITSUI MINING & SMELTING CO., LTD.) of a 270-mm square size on the further outer side thereof, five sheets of a cushion material (thickness 0.2 mm, manufactured by Oji Paper Co., Ltd., KS190) of a 265-mm square size on the further outer side thereof, and a copper foil (thickness 12 μm, manufactured by MITSUI MINING & SMELTING CO., LTD.) of a 260-mm square size on the further outer side thereof were disposed on each of both surfaces of the resultant. The resultant in this state was subjected to a step of heating and pressurizing by using a pressing apparatus (manufactured by Meiki Co., Ltd., MHPC-VF-350-350-3-70) under the conditions of a pressure of 3 MPa, a degree of vacuum of 40 hPa, a temperature increase rate of 4° C./min, a temperature of 240° C. and a retention time of 85 minutes, and an organic core material according to Example 1 was obtained.

An organic core material according to Example 2 was obtained in the same manner as in Example 1.

Examples 3 and 4

Prepregs were produced in the same manner as in Example 1, and then one sheet of a prepreg of a 250-mm square size and having a mass proportion of the resin content of 70% by mass was disposed on each of the upper surface and the lower surface of superposed six sheets of the prepreg of a 250-mm square size and having a mass proportion of the resin content of 50% by mass. A copper foil (thickness 5 μm, manufactured by MITSUI MINING & SMELTING CO., LTD.) of a 270-mm square size was disposed on the outer side of the prepreg having a mass proportion of the resin content of 70% by mass (see FIG. 3). A stainless steel plate (thickness 1.8 mm) of a 260-mm square size on the further outer side of this copper foil, a copper foil (thickness 5 μm, manufactured by MITSUI MINING & SMELTING CO., LTD.) of a 270-mm square size on the further outer side thereof, five sheets of a cushion material (thickness 0.2 mm, manufactured by Oji Paper Co., Ltd., KS190) of a 265-mm square size on the further outer side thereof, and a copper foil (thickness 12 μm, manufactured by MITSUI MINING & SMELTING CO., LTD.) of a 260-mm square size on the further outer side thereof were disposed on each of both surfaces of the resultant. The resultant in this state was subjected to a step of heating and pressurizing by using a pressing apparatus (manufactured by Meiki Co., Ltd., MHPC-VF-350-350-3-70) under the conditions of a pressure of 3 MPa, a degree of vacuum of 40 hPa, a temperature increase rate of 4° C./min, a temperature of 240° C. and a retention time of 85 minutes, and an organic core material according to Example 3 was obtained.

An organic core material according to Example 4 was obtained in the same manner as in Example 3.

Comparative Examples 1 and 2

Prepregs were produced in the same manner as in Example 1, subsequently a copper foil (thickness 5 μm, manufactured by MITSUI MINING & SMELTING CO., LTD.) of a 270-mm square size on the outer side of superposed eight sheets of the prepreg of a 250-mm square size and having a mass proportion of the resin content of 50% by mass, a stainless steel plate (thickness 1.8 mm) of a 260-mm square size on the further outer side thereof, a copper foil (thickness 5 μm, manufactured by MITSUI MINING & SMELTING CO., LTD.) of a 270-mm square size on the further outer side thereof, five sheets of a cushion material (thickness 0.2 mm, manufactured by Oji Paper Co., Ltd., KS190) of a 265-mm square size on the further outer side thereof, and a copper foil (thickness 12 μm, manufactured by MITSUI MINING & SMELTING CO., LTD.) of a 260-mm square size on the further outer side thereof were disposed on each of both surfaces of the resultant, the resultant was heated and pressurized by using a pressing apparatus (manufactured by Meiki Co., Ltd., MHPC-VF-350-350-3-70) under the conditions of a pressure of 3 MPa, a degree of vacuum of 40 hPa, a temperature increase rate of 4° C./min, a temperature of 240° C. and a retention time of 85 minutes, and an organic core material according to Comparative Example 1 was obtained.

An organic core material according to Comparative Example 2 was obtained in the same manner as in Comparative Example 1. The organic core materials obtained by the above-described methods were subjected to each evaluation according to the following evaluation methods. The results are shown in Tables 1 and 2.

<Calculation of Thickness Standard Deviation of 50-Mm Square Size>

A range of a 150-mm square size at the center of an organic core material of a 250-mm square size (square measuring 250 mm on each side as viewed in a plan view) was divided into nine 50-mm square areas, and the value of standard deviation of the thicknesses of the nine areas was calculated. In the case of a large-sized package dedicated for servers, it was assumed that the chip size would be about 50 mm on each of four sides, and a 50-mm square was set as the range for standard deviation calculation. On the outer side of the 150-mm square size at the center, since the resin included in the prepreg flowed out to the outer side of the prepreg, and the organic core material became thin, the outer side was not used for the evaluation.

The thicknesses at four points of the four vertices of the 50-mm square area were measured by using a micrometer (manufactured by Mitutoyo Corporation, ID-C112X). The value of standard deviation was calculated by taking the values of thickness of the four points as a population. The maximum value among the values of standard deviation calculated from the nine areas was designated as the value of standard deviation of each organic core material, and the maximum value is described in Tables 1 and 2.

<Calculation of Thickness Standard Deviation of 70-Mm Square Size>

A range of a 140-mm square size at the center of an organic core material of a 250-mm square size (square measuring 250 mm on each side as viewed in a plan view) was divided into four 70-mm square areas, and the value of standard deviation of the thicknesses of the four areas was calculated. Since the range of irradiation with UV at the time of forming a photoresist pattern in the copper wiring forming step was a 70-mm square, a 70-mm square was set as the range for standard deviation calculation. The thicknesses at four points of the four vertices of the 70-mm square area were measured by using a micrometer. The value of standard deviation was calculated by taking the values of thickness of the four points as a population. The maximum value among the values of standard deviation calculated from the four areas was designated as the value of standard deviation of each organic core material, and the maximum value is described in Tables 1 and 2.

<Evaluation of Yield of Solder Bump Connection>

An organic core material of a 250-mm square size (square measuring 250 mm on each side as viewed in a plan view) was prepared. The central region (range of a 150-mm square size) of this organic core material was cut out into a 30-mm square size with a cutting machine. For the cutting, REFINE SAW EXCEL A (manufactured by Refine Tec, Ltd.) was used. After the cutting, the organic core material was immersed in a 10% by mass aqueous solution of sulfuric acid for 1 minute to wash the substrate surface. Thereafter, the organic core material was washed by using pure water.

A flux (manufactured by SENJU METAL INDUSTRY CO., LTD., SPARKLE FLUX WF-6317) was applied on the substrate surface, and then a chip with solder bumps (manufactured by WALTS CO., LTD., FBW150-0001JY) that will be described below was placed thereon. Thereafter, the resultant was placed in a nitrogen reflow furnace (manufactured by SENJU METAL INDUSTRY CO., LTD., SNR-1065GT) at 260° C., and the chip was mounted on the substrate.

A chip with solder bumps has a structure in which copper pillars are disposed on a silicon wafer surface, and solder is disposed on end faces of the copper pillars, the end faces being different from the silicon wafer. A copper pillar and solder are together referred to as solder bump. The size of each configuration was as follows.

Size of chip with solder bumps: 25-mm square
Thickness of silicon wafer: 725±25 μm
Pitch of solder bumps: 150 μm
Height of copper pillar: 45 μm
Height of solder bump: 15 μm
Diameter of solder: 75 μm The flux between the chip with solder bumps and the organic core material was removed by using an ultrasonic cleaner (manufactured by AS ONE Corporation, VS-100III). The conditions were set to a frequency of 45 kHz and a washing time of 10 minutes. Thereafter, the resultant was placed in an oven (manufactured by Yamato Scientific Co., Ltd., DKN402) and was heated to dry at 100° C. for 30 minutes. The organic core material having the chip with solder bumps mounted thereon was placed on a hot plate heated to 110° C., and CUF (Capillary Underfill, manufactured by Hitachi Chemical Company, Ltd., CEL-C-3730S) was injected between the organic core material and the chip with solder bumps. Thereafter, the resultant was placed in an oven and heated at 150° C. for 2 hours to be cured.

The organic core material having the chip with solder bumps mounted thereon was cast with an epoxy resin, subsequently a cross-section of the organic core material and the chip with solder bumps was observed, and the sites where the solder bump was connected to the copper foil on the surface of the organic core material, were counted. The sites where connection was confirmed included 10 sites of solder bumps at each of the four vertices of the chip with solder bumps, and there were a total of 40 sites. The number of test specimens of each sample was set to 3, and thus a total of 120 sites of solder bumps were examined for being connected to the copper foil. The proportion of connected solder bumps among the 120 sites of solder bumps was calculated, and this was designated as solder bump connection yield.

<Evaluation of Yield of Wiring Formation>

A copper wiring was formed on the organic core material by a semi-additive method as follows. First, the copper foil of the organic core material was immersed in an aqueous solution of ammonium persulfate to be etched. Thereafter, a buildup film of a thermosetting resin insulator (manufactured by Ajinomoto Fine-Techno Co., Inc., GX92) was laminated on both surfaces of the organic core material. A vacuum laminator (manufactured by Nikko Materials Co., Ltd., V-130) was used. The conditions were set to a pressure of 0.5 MPa, a vacuum drawing time of 15 seconds, a pressurization time of 60 seconds, and a temperature of 50° C. Thereafter, the resultant was placed in an oven and was heated to dry at 130° C. for 15 minutes and heated to cure at 190° C. for 120 minutes. As a result, insulating layers 15 were formed respectively on both surfaces of the organic core material ((a) in FIG. 5).

A seed layer 16 was formed by a sputtering method on the surface of one buildup film layer ((b) in FIG. 5). The seed layer 16 had a two-layer structure of a 25-nm titanium layer and a 150-nm copper layer. Thereafter, a photoresist film of a photosensitive resin composition (manufactured by Hitachi Chemical Company, Ltd., RY-5107UT) was laminated on the seed layer by using a vacuum laminator. The conditions were set to a pressure of 0.5 MPa, a vacuum drawing time of 15 seconds, a pressurization time of 60 seconds, and a temperature of 50° C. As a result, a photosensitive resin layer 17 was formed on the surface of the seed layer 16 ((c) in FIG. 5).

A region of a square measuring 70 mm on each side was irradiated with UV to be exposed, by using a projection exposure apparatus (manufactured by CERMA PRECISION, INC., S6Ck exposure machine). Thereafter, a 1% by mass aqueous solution of sodium carbonate was sprayed to perform development by using a spin developing machine (manufactured by Blue Ocean Technology, Ltd., ultrahigh pressure spin developing apparatus). A pattern of resist width/space width=2 μm/2 μm was produced by this step ((a) in FIG. 6). Thereafter, resist residue generated during development was removed by exposing the resist pattern to oxygen plasma by using a plasma asher (manufactured by Nordson Advanced Technology Japan K.K., AP series batch type plasma treatment apparatus).

A wiring 18 of wiring width/space width (L/S)=2 μm/2 μm was formed by an electrolytic copper plating method ((b) in FIG. 6). The wiring height was set to 3 μm. A 2.38% by mass aqueous solution of TMAH (tetramethylammonium hydroxide) was sprayed with a spin developing machine, and the resist was peeled off ((c) in FIG. 6). The seed layer 16 exposed by peeling off the resist was removed by etching (FIG. 7). The copper layer was removed by immersing for 45 seconds at 23° C. in an aqueous solution obtained by mixing an etching liquid for copper (manufactured by MITSUBISHI GAS CHEMICAL COMPANY, INC., WLC-C2) and pure water at a mass ratio of 1:1 and then washing with pure water. The titanium layer was removed by immersing for 65 seconds at 23° C. in an aqueous solution obtained by mixing an etching liquid for titanium (manufactured by MITSUBISHI GAS CHEMICAL COMPANY, INC., WLC-T) and a 23% aqueous solution of ammonia at a mass ratio of 50:1 and then washing with pure water.

The copper wiring of wiring width/space width=2 μm/2 μm was observed with a metallurgical microscope, the number of wirings without defects such as wiring collapse, wiring loss, connection between wirings, and wiring deformation, was counted, and the proportion with respect to the wirings produced at 45 sites was calculated. This was designated as wiring yield. The evaluation criteria were as follows.

A: Wiring yield is 75% or higher and 100% or lower.

B: Wiring yield is 50% or higher and lower than 75%.

C: Wiring yield is 0% or higher and lower than 50%.

<Measurement of Wiring Width>

A cross-section of a copper wiring (copper wiring:wiring width/space width (L/S)=5 μm/5 μm as design values) produced by a semi-additive method was observed by using an SU8200 type scanning electron microscope (Hitachi High-Technologies Corporation), and the width of the wiring was measured. The width of wiring was measured at a total of three measurement points corresponding to the center of a range (square measuring 70 mm on each side) that could be irradiated with UV at one time, any one vertex among the four vertices of this square, and a vertex positioned diagonally to the above-described vertex. The standard deviation was calculated by taking three measured values as a population.

<Calculation of Thickness Standard Deviation of 50-Mm Square Size>

The thickness standard deviation of a laminated body including an organic core material and insulating layers formed respectively on both surfaces of the organic core material (see (a) in FIG. 5). A range of a 150-mm square size at the center of the laminated body of a 250-mm square size (square measuring 250 mm on each side as viewed in a plan view) was divided into nine 50-mm square areas, and the value of standard deviation of the thicknesses of the nine areas was calculated. In the case of a large-sized package dedicated for servers, it was assumed that the chip size would be about 50 mm on each of four sides, and a 50-mm square was set as the range for standard deviation calculation.

The thicknesses at four points of the four vertices of the 50-mm square area were measured by using a micrometer (manufactured by Mitutoyo Corporation, ID-C112X). The value of standard deviation was calculated by taking the values of thickness of the four points as a population. The maximum value among the values of standard deviation calculated from the nine areas was designated as the value of standard deviation of each laminated body, and the maximum value is described in Tables 1 and 2.

TABLE 1

| | | Example 1 | Example 2 | Example 3 | Example 4 |
|---|---|---|---|---|---|
| Number of times of heating and pressure molding | | 2 | 2 | 1 | 1 |
| Standard deviation of thickness of organic core material [μm] | Square region measuring 50 mm on each side | 2.8 | 3.4 | 2.9 | 3.5 |
| | Square region measuring 70 mm on each side | 3.4 | 3.8 | 3.6 | 3.9 |
| Yield of solder bump connection [%] | | 92 | 91 | 92 | 90 |
| Yield of wiring formation (L/S = 2/2 μm) | | A | B | A | B |
| Standard deviation of wiring width (L/S = 5/5 μm) [μm] | | 0.4 | 0.8 | 0.5 | 0.9 |
| Standard deviation of thickness of laminated body [μm] | | 3.2 | 3.8 | 3.4 | 4.0 |

TABLE 2

| | | Comparative Example 1 | Comparative Example 2 |
|---|---|---|---|
| Number of times of heating and pressure molding | | 1 | 1 |
| Standard deviation of thickness of organic core material [μm] | Square region measuring 50 mm on each side | 3.7 | 5.7 |
| | Square region measuring 70 mm on each side | 4.1 | 6.2 |
| Yield of solder bump connection [%] | | 88 | 84 |
| Yield of wiring formation (L/S = 2/2 μm) | | C | C |
| Standard deviation of wiring width (L/S = 5/5 μm) [μm] | | 1.2 | 1.7 |
| Standard deviation of thickness of laminated body [μm] | | 4.1 | 6.1 |

INDUSTRIAL APPLICABILITY

According to the present disclosure, there are provided an organic core material that is useful for realizing high density and high reliability of semiconductor packages to a greater extent, a method for producing the organic core material, a laminated body including the organic core material, and a wiring board.

REFERENCE SIGNS LIST

1: first layer, 1*a*: first fiber cloth, 1*b*: first resin layer (before curing), 1B: first resin layer (after curing), 2: second layer, 2*a*: second fiber cloth, 2*b*: second resin layer (before curing), 2B: second resin layer (after curing), 3: resin layer, 5: metal foil, 10: organic core material, 20: laminated body, 10P, 20P, 30P: laminated body, 15: insulating layer, 16: seed layer, 17: photosensitive resin layer, 18: wiring, 40: laminated body, 50: wiring board, F1, F2: surface, P1: first prepreg, P2: second prepreg.

The invention claimed is:

1. A method for producing an organic core material, the method comprising steps of:

preparing a plurality of sheets of first prepregs, each first prepreg having a first fiber cloth and a first resin layer formed from a first resin component and having the first fiber cloth embedded therein;

preparing at least two sheets of second prepregs, each second prepreg having a second fiber cloth that is a woven fabric and a second resin layer formed from a second resin component and having the second fiber cloth embedded therein; and heating a laminated body including a first sheet of the second prepregs, the plurality of sheets of the first prepregs, and a second sheet of the second prepregs in order while applying a pressing force in a thickness direction of the laminated body, wherein a content percentage of the second resin component based on a mass of the second prepreg is higher than a content percentage of the first resin component based on a mass of the first prepreg.

2. The method according to claim 1, wherein the content percentage of the second resin component based on the mass of the second prepreg is 60% by mass or more in each of the first sheet and the second sheet of the second prepregs that includes the woven fabric.

3. The method according to claim 2, wherein the laminated body includes:

an intermediate body consisting of the plurality of sheets of the first prepregs;

the first sheet of the second prepregs that is in contact with a first surface of the intermediate body; and the second sheet of the second prepregs that is in contact with a second surface of the intermediate body, and wherein the content percentage of the first resin component based on a mass of the first prepreg is set to a same predetermined value in each of the plurality of sheets of the first prepregs.

4. The method according to claim 3, wherein the first fiber cloth in each of the plurality of sheets of the first prepregs is a woven fabric.

5. The method according to claim 2, wherein a difference between the content percentage associated with the second resin component and the content percentage associated with the first resin component is at least 20%.

6. The method according to claim 2, wherein the laminated body includes:

an intermediate body consisting of the plurality of sheets of the first prepregs;

the first sheet of the second prepregs that is in contact with a first surface of the intermediate body; and the second sheet of the second prepregs that is in contact with a second surface of the intermediate body, and wherein the first fiber cloth in each of the plurality of sheets of the first prepregs is a woven fabric.

7. The method according to claim 1, wherein a difference between the content percentage associated with the second resin component and the content percentage associated with the first resin component is at least 20%.

8. The method according to claim 7, wherein the content percentage of the first resin component is approximately 50% based on a mass of the first prepreg, and wherein the content percentage of the second resin component is approximately 70% based on a mass of the second prepreg.

9. The method according to claim 1, wherein the first fiber cloth in each of the plurality of sheets of the first prepregs is a woven fabric.

10. The method according to claim 1, wherein the method further comprises, prior to heating the laminated body:

heating an intermediate body consisting of the plurality of sheets of the first prepregs while applying a pressing force in a thickness direction of the intermediate body, wherein the first fiber cloth in each of the plurality of sheets of the first prepregs is a woven fabric; and placing the intermediate body between the first sheet and the second sheet of the second prepregs.

11. The method according to claim 1, wherein prior to heating the laminated body, an intermediate body comprising the plurality of sheets of the first prepregs is placed between the first sheet and the second sheet of the second prepregs.

12. The method according to claim 1, wherein the method further comprises, prior to heating the laminated body, placing the plurality of sheets of the first prepregs between the first sheet and the second sheet of the second prepregs.

* * * * *